United States Patent
Wissmach et al.

[11] Patent Number: 6,154,090
[45] Date of Patent: Nov. 28, 2000

[54] METHOD OF AND AN ACTIVE FILTER FOR REDUCING A RESIDUAL RIPPLE OF A CURRENT DRAWN BY A LOAD FROM A NETWORK

[75] Inventors: Walter Wissmach, Munich; Rudolf Bauer, Erpfting bei Landsberg am Lech, both of Germany

[73] Assignee: Hilti Aktiengesellschaft, Schaan, Liechtenstein

[21] Appl. No.: 09/292,091

[22] Filed: Apr. 14, 1999

[30] Foreign Application Priority Data

Apr. 15, 1998 [DE] Germany ............................ 198 16 685

[51] Int. Cl.⁷ ............................... H03K 5/00; H02M 7/00
[52] U.S. Cl. ........................... 327/552; 327/551; 327/311; 363/45; 363/46
[58] Field of Search .................................... 327/551, 552, 327/311; 363/124, 39, 47, 45, 46

[56] References Cited

U.S. PATENT DOCUMENTS

| | | | |
|---|---|---|---|
| 4,384,321 | 5/1983 | Rippel | 363/124 |
| 5,278,489 | 1/1994 | Bowers | 323/225 |
| 5,844,786 | 12/1998 | Yoshida et al. | 363/21 |

FOREIGN PATENT DOCUMENTS

| | | |
|---|---|---|
| 0793334 | 9/1997 | European Pat. Off. . |
| 363277426A | 11/1988 | Japan ................................. 327/551 |

*Primary Examiner*—Dinh T. Le
*Attorney, Agent, or Firm*—Brown & Wood, LLP

[57] ABSTRACT

A method of reducing feedback action on a timely flow of current, which is drawn by a load from a network via rectifier, by active filtering of upper harmonics, which are superimposed on a network first harmonic, with a power factor corrector circuit with a pulse-width modulation of a switch signal which influences the current drawn from the network and flowing through a boost-converter, with the method including dividing a current path between the rectifier (2) and the load (10) in a plurality of parallel channels (It, Jt), and providing in each channel (It, Jt) a similarly active filter, with switch signals of both active filters having a substantially same pulse-width modulation and being phase-sifted relative to each other so that a reduced ripple of the total current, which results form cumulative superimposition of currents in separate channels, is produced at a network input (9); and an active filter for effecting the method.

9 Claims, 1 Drawing Sheet

METHOD OF AND AN ACTIVE FILTER FOR REDUCING A RESIDUAL RIPPLE OF A CURRENT DRAWN BY A LOAD FROM A NETWORK

BACKGROUND OF THE INVENTION

1. Field of the Invention

The present invention relates to a method of and an active network feedback filter for reducing feedback action on a timely flow of current, which is drawn by a load from a network via rectifier.

2. Description of the Prior Art

Many new electric and electronic apparatuses, in particular, power units, switching power components, control gears, frequency converters, electronic commutated drives and the like draw more or less noticeable non-sinusoidal current when corresponding counter-measures are not taken. The current drawn from a network has a more or less high upper harmonic component. According to existing standards and regulations, the electrical apparatuses of the above-describe types, among them also electrical power tools, should draw from a public power network only a certain proportion of the current with an upper harmonic component. The counter-measures can include active or passive filters which bring with them, in particular for middle and high power-operated a noticeable increase in costs and weight of apparatuses equipped with such filters. For hand-held electrical power tools, often, providing such filters is associated with increased space requirements and assembly complications.

There exist numerous methods for bring the upper harmonics below a predetermined rate. There further exists a rough difference between passive and active filters. Passive filters consist, as a rule, of inductive resistors and capacitors connected downstream of a.c. side or of a rectifier and arranged on a d.c. side For active filters, different topologies are known. They include, as a rule, at least one electronic power switch. A survey of known methods and circuits for reducing network residual ripples, both passive and active, is given in an article of Dr. Richard Redl, "Achieving Compliance with New Line-Harmonics Regulations," ELFI S. A., documents of the seminar of PCIM '96, May 20, 1996, Nurnberg.

A further development of the active methods is known as a Power Factor Corrector (PFC) solution. It consists, in principle, in providing in a current path of a load a boost-converter, with which the current drawn from a network is regulated so that it becomes sinusoidal. Such a power factor correction is described in detail in the article of Michael Herfurth, "Active Upper Harmonic Filtering for a Network Rectifier with a High Output Power," Siemens Components 24 (1986), booklet 1, p.p. 9–13. This solution is also described in European Patents EP O 669 703 A2 and EP O 675 588 A2.

According to the method described in M. Herfurth's article, the network current, which flows through the inductive resistor of the seriesly connected choke, is converted into a current with a desired sinusoidal shape and having a triangular or ramp-shaped residual ripple. This residual ripple has a high-frequency component, which in order to satisfy the requirements of the Radio Interference standard, again should be attenuated, as a rule, with a passive filter. Here, there exists an inverse connection between expenditures associated with a boost-converter and a radio interference filter. The higher is the switching or commutation frequency or the inductance of the booster-choke the smaller is the residual ripple of the network current and, thereby, the smaller are expenditures associated with a radio interference filter. Even if a compromise can be reached, still with all active solutions and associated with them expenditures, in particular, for hand-held tools, the weight and volume of the inductive components is a noticeable drawback.

In order to further reduce the current residual ripple, without increasing the size of the booster-choke, the commutation frequency can be increased. However, with this, switching losses in the power switching transistor are increased, as disclosed in the M. Herfurth's article. With contemporary solutions, a conventional switching frequency lies in a frequency range from about 40 kilocycles to about 100 kilocycles.

Accordingly, an object of the present invention is a method and a circuit which permit to further reduce undesirable feedbacks which influence a timely flow of a current drawn from a network during operation of a load, in particular, when the current flows via rectifier.

SUMMARY OF THE INVENTION

This and other objects of the present invention, which will become apparent hereinafter, are achieved by providing a method of reducing feedback action on a timely flow of current, which is drawn by a load from a network via a rectifier, by active filtering of upper harmonics, which are superimposed on a network first harmonic, with a power factor corrector circuit with a pulse-width modulation of a switch signal which influences the current drawn from the network and flowing through a boost-converter, which method includes dividing a current path between the rectifier and the load in a plurality of parallel channels and providing in each channel a similarly active filter, with switch signals of both active filters having a substantially same pulse-width modulation and being phase-sifted relative to each other so that a reduced ripple of the total current, which results from cumulative superimposition of currents in separate channels, is produced at a network input.

The objects of the invention are also achieved by providing an active network feedback filter including a boost-converter for each of the plurality of parallel channels and including a booster-choke and a booster-diode, and a power factor corrector associated with a respective boost-converter and including a switch arranged in a shunt arm connecting a junction point between the booster-choke and the booster-diode of the respective boost-converter to a reference potential, with the switches of the power factor corrector being controlled with respective phase-shifted signals having the same pulse-width repetition rate.

The method and the network feedback filter according to the present invention are based on a basic concept of providing a plurality of parallel-connected boost-converters. Thereby, as it will be explained below, the current feedback is substantially reduced at a given switching frequency, by a half, with the frequency of the residual ripple being doubled. Both result in reduction of expenditures for a radio interference filter which is arranged upstream of the boost-converter.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
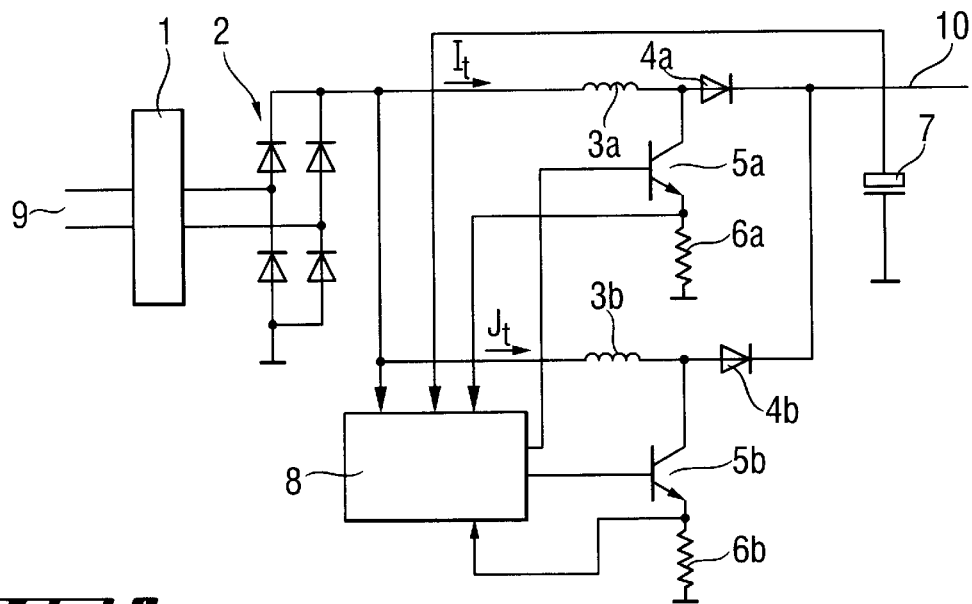
FIG. 1 shows a basic diagram of an active network feedback filter with features according to the present invention.

FIG. 1 shows an active network feedback filter with two boost-converters arranged in separate but parallel current paths. An input rectifier 2, which is connected to a network 9 via a radio interference filter, has its output connected to a load connection 10 via two parallel current channels, namely, via a series connection of a first booster-choke 3a and a first booster-diode 4a and a series connection of a second booster-choke 3b and a second booster-diode 4b. Both current channels It and Jt commonly use an intercapacitor 7 in the same way as the input rectifier 2 and the radio interference filter 1 are used. A circuit element 5a or 5b of a power factor corrector forms a respective shunt arm which connects the junction point between the booster-choke 3a, 3b and the booster-diode 4a, 4b, respectively, with a reference potential. The circuit element 5a, 5b can be formed of one or, in case of a larger power, several, connected parallel to each other switching transistors which, if necessary, can be separated in two groups. In the present case, two groups 5a and 5b are formed. Simply, the booster-diodes 4a and 4b and the booster-inductivities or booster-chokes 3a, 3b should be repeated several times, in the present case, duplicated. They also can, however, be calculated for one corresponding factor, e.g., half current. This constitute a first advantage of the present invention because with large choke components, according to the present invention, they can be divided in a plurality of small components which contributes to cost reduction and freedom of assembly and, thus, to favorable assembly characteristics. A further advantage of the present invention consists in that noticeable savings regarding the power components can be achieved with the use of the radio interference filter 1, without other additional expenditures. I.e., with the same radio interference filter 1, the booster-chokes 3a, 3b can be reduced in size and/or the switching frequency can be reduced.

In order to achieve these advantages, it is, however, necessary to suitably control both boost-converter channels with a control block 8. This means that both current lines It and Jt are steered not synchronously, which would have corresponded to a single-line solution, but with a corresponding phase shift between channels. In the embodiment shown in FIG. 1, with two current channels, the phase shift is achieved by providing pulse width modulators in respective power factor correctors. The pulse width modulators steer both current channels with sawtooth signals which are phase-shifted by 180°. This results in that more or less triangular ripples of both current channels, which are generated by the pulse width modulation, are likewise phase-shifted by 180°. At the network input 9 where both current components join the network current, a partial compensation of these ripples takes place, and the resulting ripple becomes noticeably smaller, with the ripple frequency corresponding to a dual commutation frequency of a single power factor corrector.

Figure 2:
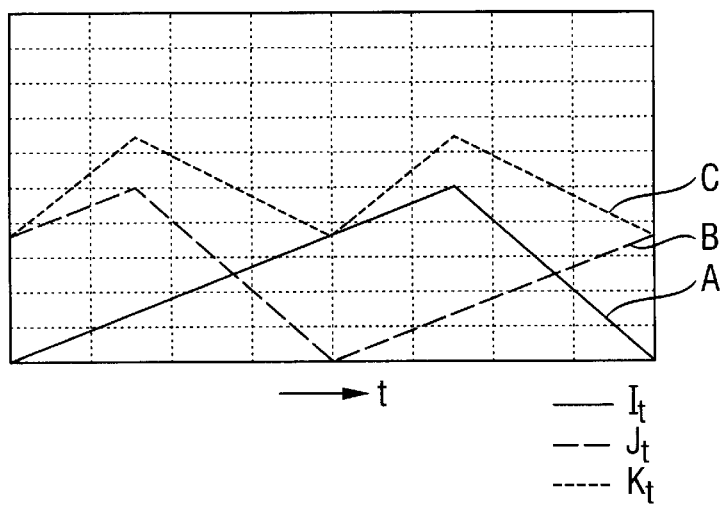
FIG. 2 shows a diagram of a time-dependent current flow in different points of the circuit shown in FIG. 1.

This case is illustrated in the current flow diagram of FIG. 2, where the curve A schematically shows the current flow It in the first booster-choke 3a, the curve B show the current flow Jt in the second booster-diode 3b, and the curve C shows the total current.

An optimal case results when the phase current is represented by a symmetrical triangular course. This is the case when the switch-on and switch-off times of both switches 5a and 5b are the same. Then, the ripples of both current components are completely erased, and the network side total or aggregate current becomes "ideally smooth."

The basic method can be described as transformation when the commutation frequency of the switches 5a, 5b is increased to a higher frequency, namely, by a multiple corresponding to the number of current channels, in the present case, by a factor "2." The entire circuit then behaves similar to a boost-converter arrangement without, however, of its drawbacks, namely, increased switching and magnetization losses.

The above-described advantages are also achieved, partially at an increased degree, when three or more channels are provided. The separate channels should be steered, respectively, with an appropriate phase shift, so that the residual ripple at the network is minimal when the phase shift ▲ϕ between the lines is ▲ϕ=360°/No of channels.

The increased expenditure, which is associated with the increase of the current channels, should be compared with the advantage achieved by providing the increased number of current channels, namely, with the possibility to further reduce the size of the booster-chokes and with the simplification of the radio interference filter.

For an optimal adaptation to a particular radio interference filter or to a corresponding radio interference standard, in a particular case, it can be proved advantageous to deviate from the above-defined phase shift. In such a case, uneven harmonics of the network frequency are not completely eliminated. Therefore, the even harmonics becomes somewhat smaller.

A further possibility to provide booster-chokes with smaller core dimensions, which results in cost saving and in a smaller size of the booster-chokes, consists in the following advantageous development of the present invention. It is contemplated that only a one-polar current flows through the booster-chokes 3a, 3b. Thereby, the core material is used only in one quadrant of the magnetic hysteresis curve. For a better use of the core material, it is advantageous to insert in the magnetic circuit, preferably, into the air gap, a permanent magnet or generally a permanent magnetic material the polarity of which is so selected that it is opposite the magnetization caused by the passing-through current. Thereby, the operating point of the respective booster-choke 3a, 3b is displaced, with a current passing through, as zero into the third quadrant of the hysteresis curve, whereby practically, a dual induction amplitude becomes available which permits to use a substantially smaller core size at the predetermined choke inductivity.

Based on the foregoing description of the present invention, it should be clear that there exists a possibility to form a multi-phase system of a plurality of identical power factor corrector (PFC) circuits. This can be so realized that a respective network phase forms a complete PFC-circuit with respective one-phase rectifiers the inputs of which, e.g., form a star connection, and the outputs of which are placed in parallel via corresponding decoupling diodes.

Further improvement and optimization of the circuit is achieved when a uniform current division is effected with respect to both power factor corrected current channels. Thereby, a best possible compensation of ripples is achieved. In addition, it proved to be advantageous to provide an independent current control circuit for each current channels, with a current having the same set value flowing through all of the channels. However, this causes a problem which consists in that the current, which flows through each booster-choke, should be measured separately. A conventional solution for one-line power factor correctors when the current is measured in a shunt provided in the earth return branch, can be used in a multi-channel solution according to the present invention only with high additional expenditures. Measurement in the feed branch, i.e., measuring the choke current directly should be effected at high potential and is also very expensive.

According to advantageous development of the present invention, the current is measured in connected segments of the switch 5a or 5b. The measurement can be effected, e.g., in a shunt 6a or 6b in the emitter or the source line, but can also be effected in a collector or drain line. Actually, only a portion of the current is fed by the respective switch 5a, 5b in the associated therewith booster-choke 3a, 3b, namely, when the associated switch 5a, 5b is turn on. The trailing edge of the current, which flows through the booster-choke 3a, 3b can be reconstructed with relatively small technical expenditure. How it is done will be explained with reference to FIG. 3.

Figure 3:
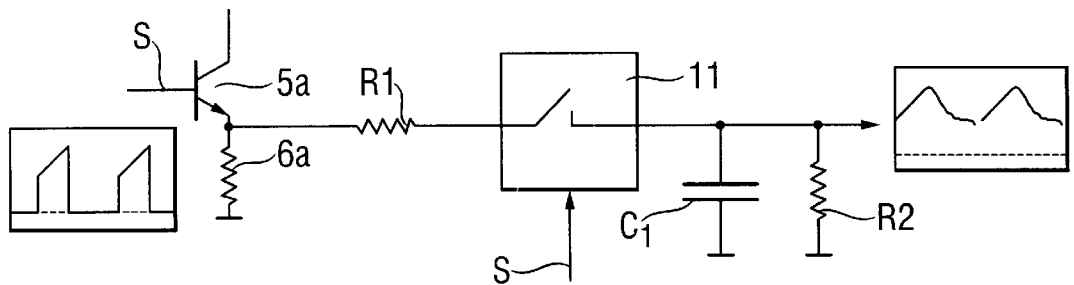
FIG. 3 shows a basic diagram of a connection circuit for reconstructing a component of a measuring current corresponding to the trailing edge of a current which flows through one of booster chokes of the circuit shown in FIG. 1.

The circuit shown in FIG. 3 serves for reconstructing the trailing edge of a current, which flows through a respective booster-diode 4a, 4b, with a RC-combination and an analog switch 11 which is controlled synchronously with a switch signal S for the switching transistor 5a or 5b. This circuit operates as follows. When the first transistor 5a is in a conductive state, the current, which flows through the booster-choke 3a and the transistor 5a increases. This current can be measured in the shunt 6a. Simultaneously, the analog switch 11 is turned on, with the voltage appearing in an energy storage capacitor C of the shunt circuit. For filtering of the disturbance variables generated upon switching of the transistor 5a, there is provided a resistance R1 having a relatively low impedance. When the transistor 5a is turned off, the current falls linearly via the booster-choke 3a. Because the current now flows into the intercapacitor 7 via the booster-diode 4a, there is no flow of current through the shunt 6a, and there is no signal of the trailing edge. This signal appears upon opening of the analog switch 11 and discharge of the capacitor C1 via the resistance R2. If the values for C1 and R2 are appropriately selected, the discharge voltage curve would be similar to the reconstructible component of the current which flows through booster-choke 3a. A large precision here is not necessary because for the associated current controller, only the current mean value is important and because, on the other hand, possible deviations of the overlapping indirect voltage controller are adjusted. A forced synchronization of the voltage of the capacitor C1 with shunt voltage takes place at the next re-actuation.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A method of reducing feedback action on a timely flow of an input current, drawn by a load from a network via a rectifier and a plurality of boost converters, by active filtering of upper harmonics of the input current using power factor corrector circuits, wherein each power factor corrector circuit includes a switch and a pulse-width modulator, the method comprising the steps of:

dividing a current path, of the input current, between the rectifier and the load into a plurality of parallel channels;

providing in each channel a boost converter including a booster-choke and a booster-diode;

providing the switch of a power factor corrector circuit in a shunt arm connecting a junction point between the booster-choke and the booster-diode of the boost converter with a reference potential; and providing a pulse-width modulation circuit connected to the switches for controlling the switches such that switch signals of respective switches have substantially the same pulse-width modulation and are phase-shifted relative to each other to produce a reduced residual ripple of the input current responsive to the load and output of the rectifier and the boost converter.

2. A method according to claim 1, further comprising the step of controlling the pulse-width modulators modulation circuit of with phase-shifted sawtooth signals from control circuits of the respective power factor corrector circuits.

3. A method according to claim 2, wherein the dividing step comprises dividing the current path into two channels, and the controlling step comprises controlling the pulse-width modulation circuit with sawtooth signals phase-shifted by 180°.

4. An active network feedback filter for reducing a residual ripple of an input current, drawn by a load from a network via a rectifier, wherein a current path, of the input current, between the rectifier and the load is divided into a plurality of parallel channels, the filter comprising a power factor corrector circuit and a boost converter for each of the channels, wherein each boost-converter includes a booster-choke and a booster-diode; and wherein the power factor corrector circuit associated with a respective boost converter includes a switch arranged in a shunt arm connecting a junction point between the booster-choke and the booster-diode of the respective boost converter with a reference potential, wherein each of the switches of the power factor corrector circuits are controlled by a pulse-width modulator responsive to the load and output of the rectifier and the boost converter to produce a reduced residual ripple of the input current.

5. A network feedback filter according to claim 4, further comprising a single intercapacitor connected to a second junction point connecting output ends of the booster-diode of each boost converter to each other boost-converters.

6. A network feedback filter according to claim 4, wherein the current path is divided in two channels, wherein the feedback filter comprises two separate, parallel-driven boost converters, and wherein respective switches are operated in opposite phases.

7. A network feedback filter according to claim 4, wherein one of a permanent magnet and a permanent magnetic material is provided in a magnetic circuit of each booster-choke, the one of a permanent magnet and a permanent magnetic material having a polarity thereof so aligned that it opposes magnetization which is caused by current flow through a respective coil of the booster-choke (3a, 3b).

8. A network feedback filter according to claim 4, wherein the shunt arm includes a shunt connected with a load current path for measuring current in a respective channel.

9. A network feedback filter according to claim 4, wherein the shunt arm has a shunt connecting the respective switch with the reference potential, the feedback filter further comprising an energy storage circuit (C1, R2), which is actuated dependent on the switch signal (S) applied to a respective switch and which forms, when the respective switch is closed, a measuring current component corresponding to a trailing edge of the current which flows through a respective booster-choke.

* * * * *